UNITED STATES PATENT OFFICE.

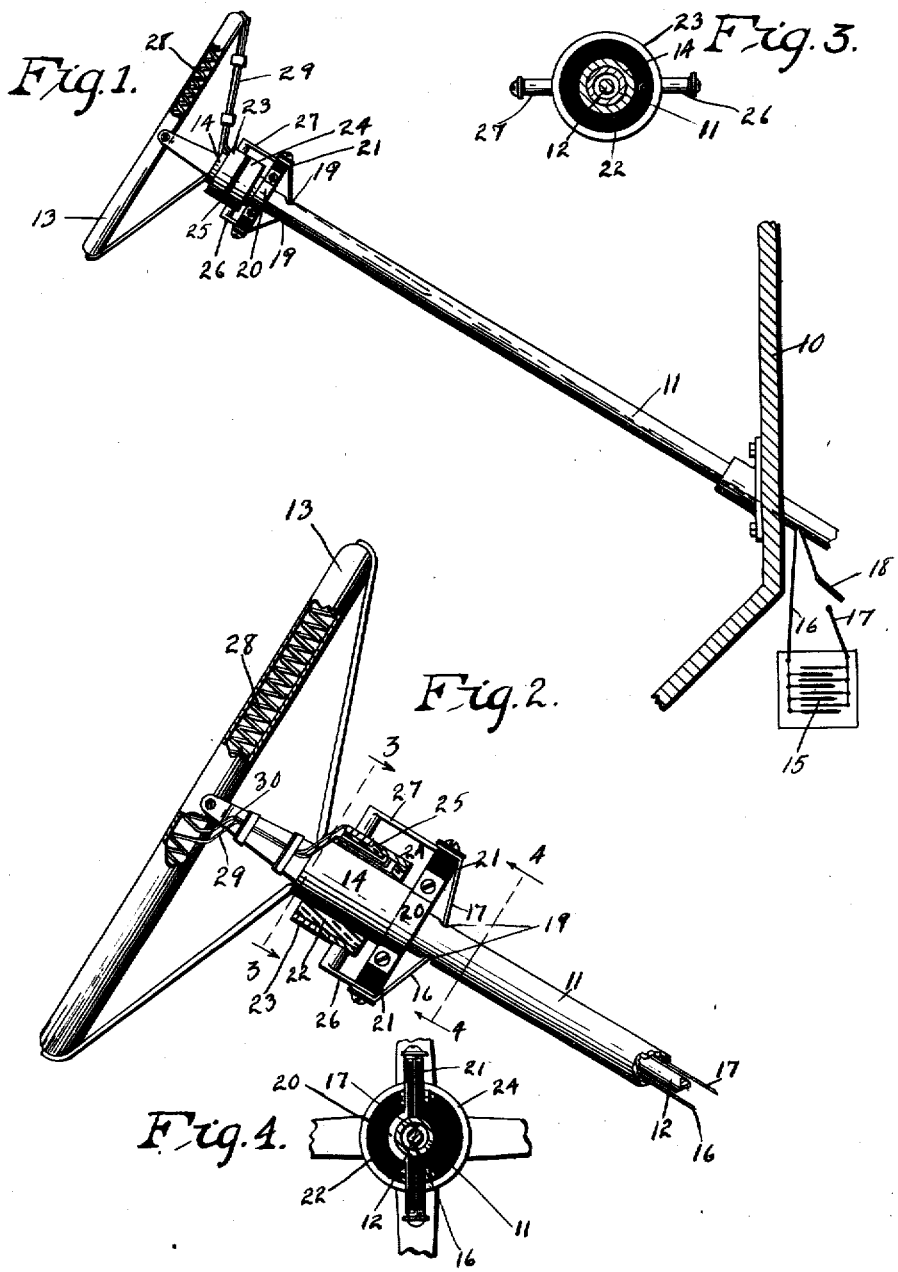

JAMES G. THARP, OF INDIANOLA, IOWA.

WARMER FOR MOTOR-CARS.

1,241,782.  Specification of Letters Patent.  Patented Oct. 2, 1917.

Application filed March 7, 1916. Serial No. 82,533.

*To all whom it may concern:*

Be it known that I, JAMES G. THARP, a citizen of the United States, and resident of Indianola, in the county of Warren and State of Iowa, have invented a certain new and useful Warmer for Motor-Cars, of which the following is a specification.

The object of my invention is to provide a warmer for motor cars of comparatively simple, durable and inexpensive construction, especially adapted for warming the steering wheel.

A further and more particular object is to provide a resistance coil mounted on or in the steering wheel of a motor vehicle, and to provide means for connecting said coil with a source of electrical energy, whereby the coil may be heated for imparting heat to the steering wheel.

My invention consists in the construction, arrangement and combination of the various parts of the device whereby the objects contemplated are attained, as hereinafter more fully set forth, pointed out in my claims, and illustrated in the accompanying drawings, in which:

Figure 1 shows a side elevation of a steering wheel equipped with a device embodying my invention.

Fig. 2 shows an enlarged, detail view partly in section, with parts broken away, showing the manner in which my device is mounted on the wheel.

Fig. 3 shows a sectional view, taken on the line 3—3 of Fig. 2, and

Fig. 4 shows a sectional view, taken on the line 4—4 of Fig. 2.

In the accompanying drawings I have used the reference numeral 10 to indicate generally the dash of a motor vehicle on which is supported the steering rod sleeve 11 in which is received the steering rod 12. At the upper end of the steering rod is a steering wheel 13, having a socket 14 mounted on the sleeve 11 and operatively connected with the steering rod 12 in any suitable way.

It is well known that in cold weather it is difficult to keep the hands warm while holding the steering wheel. I have, therefore, devised a means for keeping the steering wheel warm. In connection with my device I preferably use a hollow steering wheel, as shown in Figs. 1 and 2, which may be made of insulating material or lined therewith.

Located suitably on the vehicle is a source of electrical energy 15. Connected with the battery or the like 15 are the current conducting wires 16 and 17. Somewhere in the circuit is arranged a switch 18. The wires 16 and 18 are inserted into the lower end of the steering post sleeve 11 and extend upwardly to a point near the upper end thereof where they emerge from openings 19.

Mounted on the sleeve 11 near the upper portion thereof, is a bracket 20 having blocks of insulation material 21 clamped or mounted therein on opposite sides of the sleeve 11.

Mounted on the socket 14 is a commutator comprising the hollow cylinder 22 of insulating material. Mounted on the cylinder 22 are parallel rings 23 and 24 which may be of copper or other suitable conducting material. The rings 23 and 24 are spaced from each other and are supported by a rib or bead 25 of the insulating material.

Mounted on the insulating material on one end of the bracket 20 is a brush 26 adapted to coact with the lower ring 24, and mounted on the insulating material on the other end of the bracket 20 is a brush 27 adapted to coact with the upper ring 23. The wires 16 and 17 are connected with the respective brushes 26 and 27.

In the steering wheel 13 is a resistance coil 28 which is connected by the wires 29 and 30 to the respective rings 24 and 23.

When the device has been installed upon a motor vehicle and it is desired to warm the steering wheel 13, the switch 18 is manipulated for closing the circuit. It will readily be seen that heat will be generated in the resistance coil and transmitted to the steering wheel 13. The parts can be so constructed and arranged that the proper degree of heat may be generated.

One of the problems involved in using the resistance coil for heating the steering wheel arises from the necessity of permitting the wheel to rotate freely on the sleeve 11. If the commutator were not used, it would involve twisting the current conducting wire. I have therefore mounted on the socket the commutator whereby all twisting of the wires is obviated, and at the same time there is constant contact which keeps the circuit closed and the switches closed.

Numerous changes may be made in the construction and arrangement of the various parts of my improved device and in the manner of mounting the same on the machine, and it is my intention to cover by this application any such modifications of structure which may be included within the reasonable scope of my claims.

I claim as my invention:

In a device of the class described, a heating element adapted to be disposed within a steering wheel, a collar of insulating material fixed to the wheel and adapted to rotate around the supporting sleeve of the steering column, a pair of spaced independent conducting rings fixed to said collar, means for electrically connecting each of said rings with the heating unit, a pair of brushes adapted to be fixed to said sleeve of the steering column and each adapted to coact with one of said rings, and means for connecting each of said brushes with one pole of a source of electrical energy.

Des Moines, Iowa, December 31, 1915.

JAMES G. THARP.